United States Patent [19]

Witt

[11] 4,361,058

[45] Nov. 30, 1982

[54] DIVIDED THRUST APPARATUS

[75] Inventor: Ronald A. Witt, Milwaukee, Wis.

[73] Assignee: The Falk Corporation, Milwaukee, Wis.

[21] Appl. No.: 151,316

[22] Filed: May 19, 1980

[51] Int. Cl.³ ............................................. F16H 37/06
[52] U.S. Cl. ................................ 74/665 GD; 74/410; 74/413
[58] Field of Search ......... 74/665 GD, 665 F, 665 A, 74/665 G, 665 L, 410, 411, 397, 399, 401, 403

[56] References Cited

U.S. PATENT DOCUMENTS

| | | | |
|---|---|---|---|
| 1,077,519 | 11/1913 | Gatta | 74/665 G |
| 1,634,376 | 7/1927 | Miller | 74/410 |
| 1,759,689 | 5/1930 | Day | 74/410 |
| 1,898,198 | 2/1933 | Lysholm | 74/410 |
| 2,441,722 | 5/1948 | Schultz | 74/665.6 D X |
| 3,620,336 | 11/1971 | Clements | 74/410 X |
| 3,772,934 | 11/1973 | Warren | 74/410 |
| 4,056,018 | 11/1977 | Chung | 74/410 X |
| 4,242,920 | 1/1981 | Sigg | 74/410 X |

Primary Examiner—Nile C. Byers, Jr.
Attorney, Agent, or Firm—Quarles & Brady

[57] ABSTRACT

A gear drive has two closely spaced parallel output shafts driven by a single input shaft. One gear train connects the input shaft to one of the output shafts which has a thrust bearing at one end to absorb thrust loads. A second gear train connects the input shaft to the second output shaft. The second output shaft mounts a double helical pinion which is in engagement with two double helical gears on a pair of spaced shafts. The spaced shafts are each mounted in thrust bearings to absorb the thrust on the second output shaft which is transmitted through the meshings double helical gearing to the pair of shafts. A linkage engages the ends of the pair of shafts to equalize the thrust load on each of the two shafts.

12 Claims, 4 Drawing Figures

DIVIDED THRUST APPARATUS

BACKGROUND OF THE INVENTION

This invention relates to gear drives, and particularly to an apparatus for dividing and spreading the thrust loads to which a shaft is subject.

In gear drives a shaft will often be subjected to thrust loading by reason of the machine or other equipment being driven. Thrust bearings are commonly employed to accommodate the thrust loads. Thrust bearings are typically mounted to react against an end of the shaft remote from the origin of the load. The thrust bearing must be sized for the load which it will be expected to encounter. Generally, the diameter of the thrust bearing will increase as its capacity increases.

There are instances in which it is impossible to mount a thrust bearing of sufficient size in the desired position at the end of the output shaft. One example of such an instance involves a gear drive which includes two parallel driven output shafts which must be located in close proximity to each other and which are both subject to thrust loads. In such an arrangement the two parallel output shafts may not have sufficient clearance between them to accommodate a large diameter thrust bearing at the end of both shafts.

The apparatus of the present invention is directed to solving the problem accommodating thrust load in such an arrangement where the typical large diameter thrust bearings are unusable. The apparatus solves the problem by dividing the thrust load on one of the output shafts between two separate gear trains and moving the thrust loads radially outward from the centerline of the output shaft to positions where the thrust can be taken up in large thrust bearings provided on shafts of each of the two gear trains. The apparatus also includes means to equalize the thrust loading between the two gear trains and to reduce the speed at which the load is absorbed.

SUMMARY OF THE INVENTION

In accordance with the invention there is provided an apparatus for accommodating thrust loads on a driven output shaft of a gear drive, and which includes first bearing means which journal the output shaft and accommodates limited axial movement of the output shaft, a double helical pinion on the output shaft, two double helical gears meshing with the double helical pinion, second bearing means which journal each of the shafts supporting the double helical gears and accommodates limited axial movement of the gear shafts, and thrust bearings working against one end of each of the gear shafts.

Further in accordance with the invention there may be provided a linkage which is responsive to axial movement of the gear shafts under thrust loads to equalize the loads therebetween.

The invention may be incorporated into a gear drive which has a single input shaft and a pair of parallel, closely spaced output shafts, a first gear train drivingly connecting the input shaft to one of the output shafts, a thrust bearing on an end of such one output shaft, and a second gear train connecting the input shaft to the other output shaft which includes the double helical pinion.

It is one object of the present invention to provide an apparatus for dissipating the thrust loads on an output shaft of a gear drive.

It is another object of the invention to provide an apparatus for dividing and moving the thrust loads on an output shaft of a gear drive to two spaced apart locations where they can be dissipated by use of thrust bearings.

It is a further object of the present invention to provide such an apparatus which will equalize the thrust loads in the two thrust bearings.

It is still another object of the present invention to provide such an apparatus which transfers the thrust loads to the thrust bearings at a speed which is less than the speed of the output shaft to thereby prolong bearing life.

The foregoing and other objects and advantages of the invention will appear from the detailed description which follows. In the detailed description reference is made to the accompanying drawings which illustrate a preferred embodiment of the invention.

DETAILED DESCRIPTION OF THE INVENTION

Figure 1:
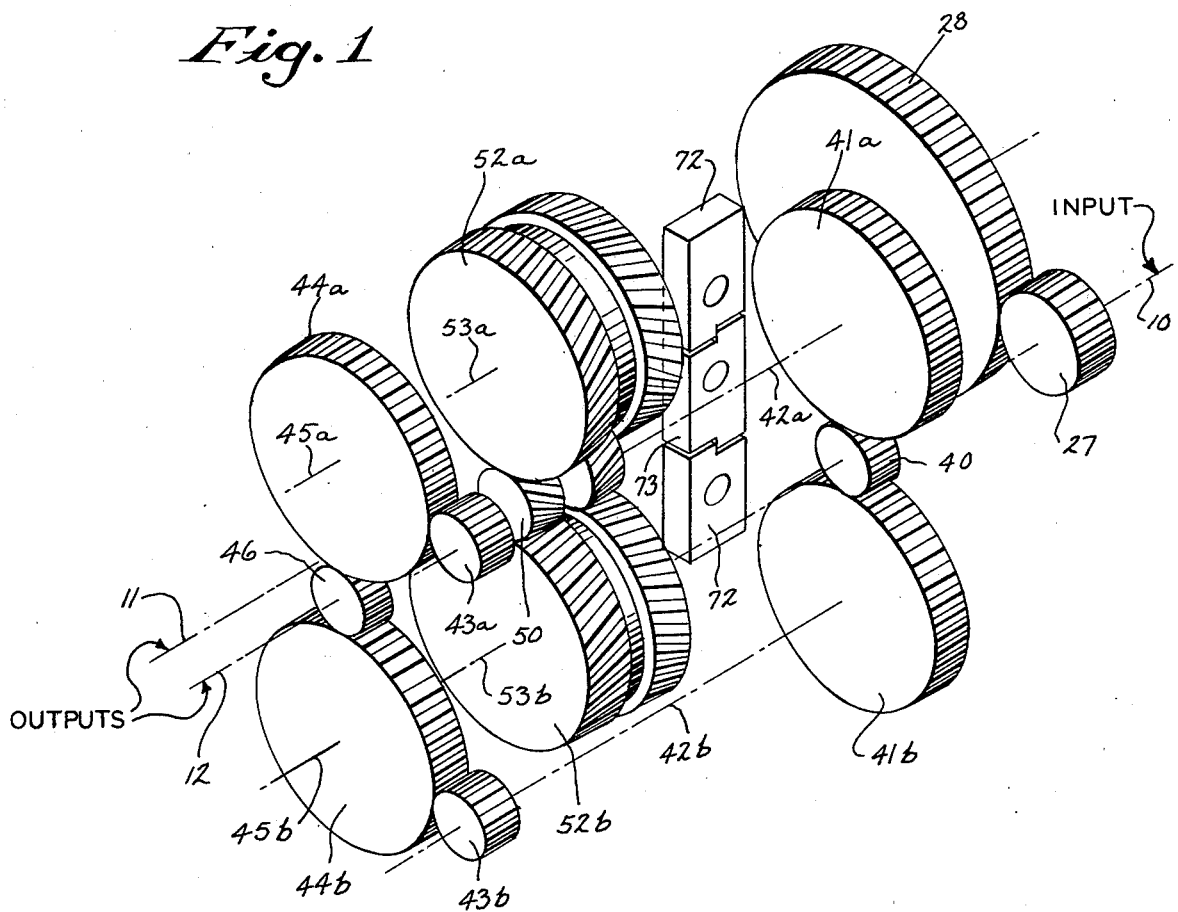
FIG. 1 is a schematic perspective view of the meshing gearing of a gear drive which incorporates the present invention and which illustrates only the center lines of shafts which mount the gearing.
Figure 2:
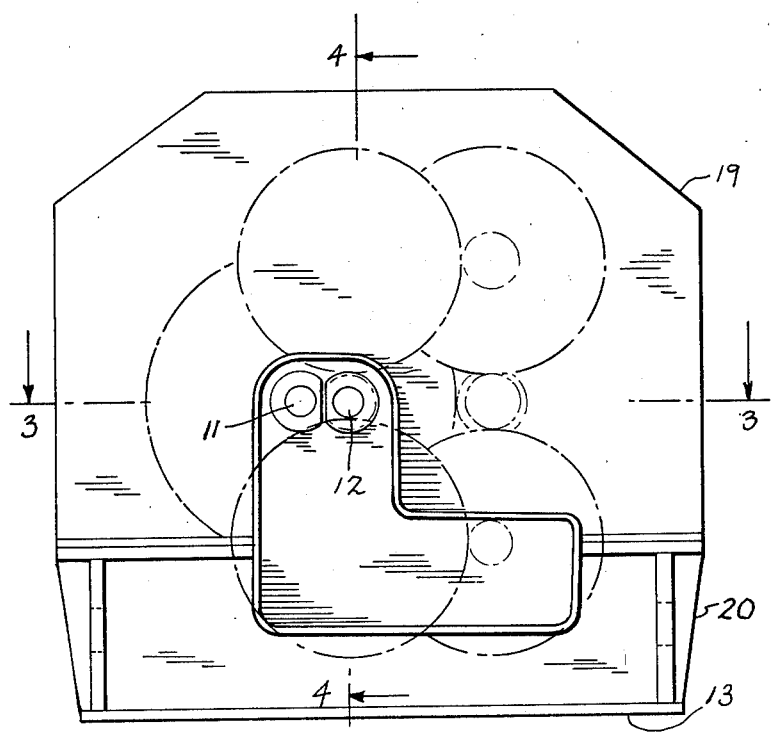
FIG. 2 is an end view in elevation of the output side of the gear drive.
Figure 3:
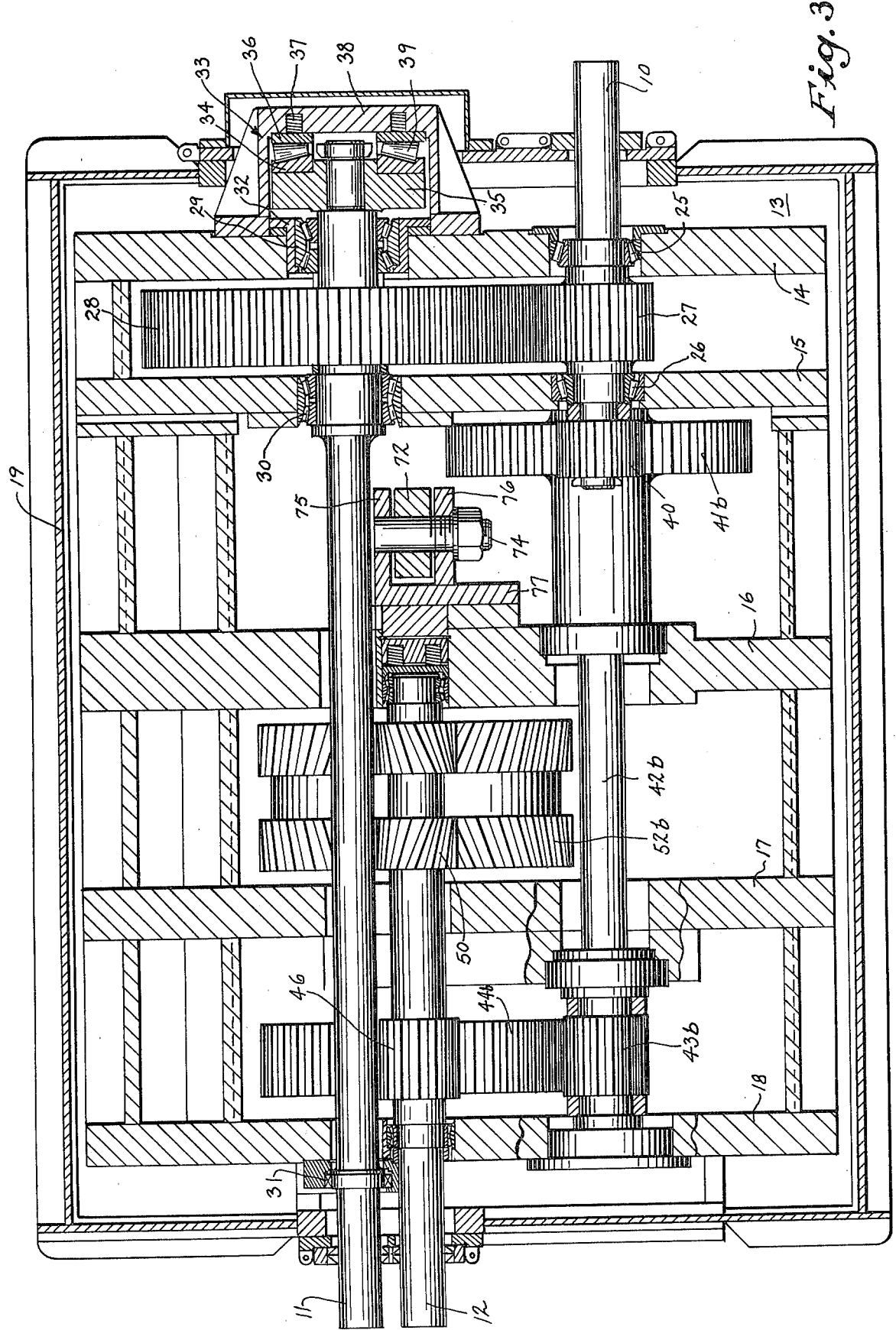
FIG. 3 is a view in horizontal section taken in the plane of the lines 3—3 of FIG. 2.
Figure 4:
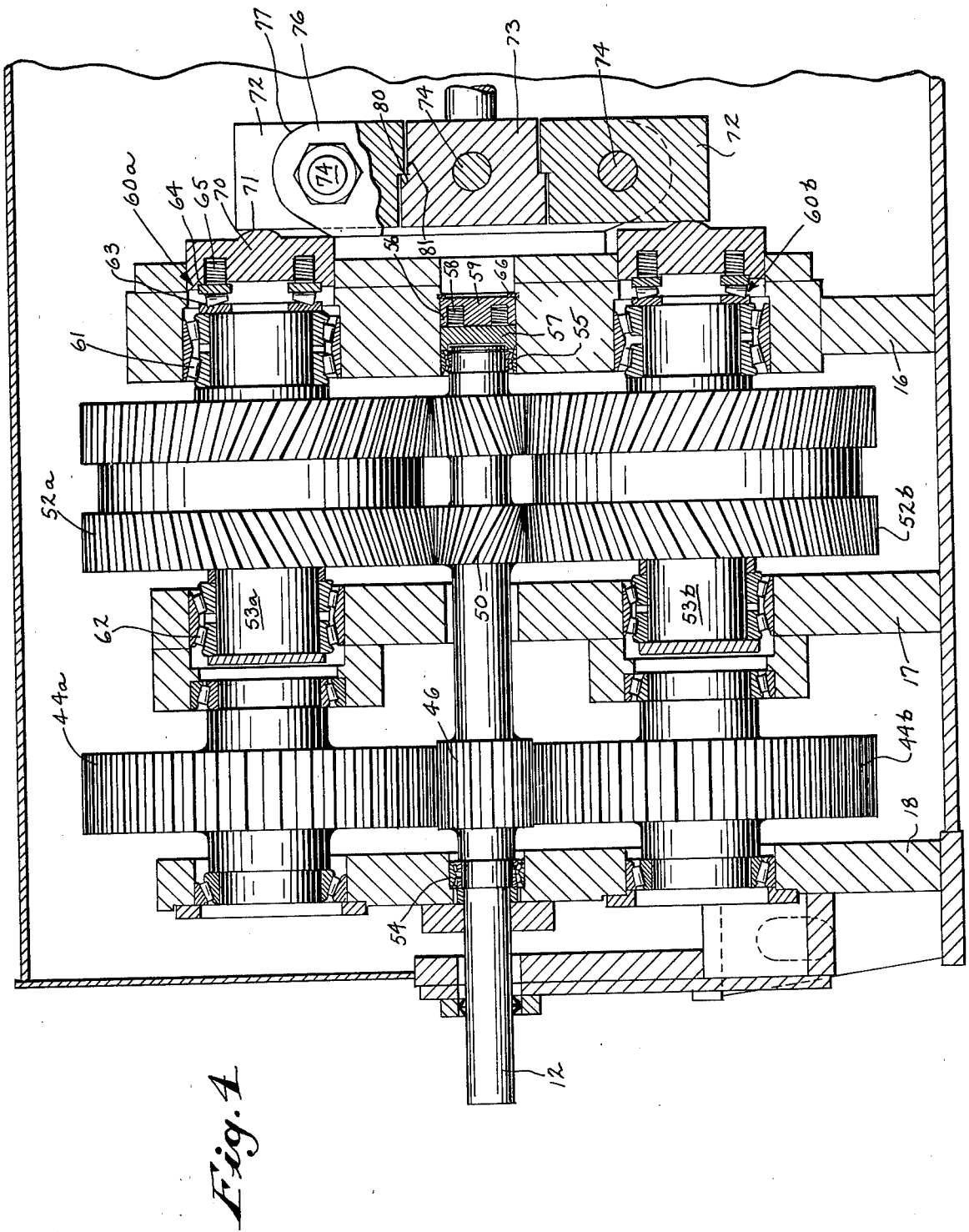
FIG. 4 is a partial view in vertical section taken in the plane of the line 4—4 of FIG. 2.

Referring to the drawings, the invention is shown incorporated into a gear drive which has a single input shaft 10 and a pair of closely spaced, parallel output shafts 11 and 12. The gear drive is enclosed in and supported by a housing which includes a floor plate 13, spaced interior walls 14, 15, 16, 17 and 18 which rise from the floor plate 13, a boxlike base 20 which rises from the floor 13 and surrounds and encloses the bottom of the walls, and a cover 19 which connects to the base 20 and surrounds the gearing.

A gear drive of this configuration may be employed to drive plastic injection molding equipment, as an example.

The input shaft 10 is journalled in a pair of tapered roller bearings 25 and 26 mounted in bores in the input wall 14 and the first intermediate wall 15, respectively. A first drive pinion 27 is formed on the input shaft 10 between the bearings 25 and 26. This first drive pinion 27 meshes with a driven gear 28 mounted on the output shaft 11. The output shaft 11 is journalled in a pair of double-row tapered roller bearings 29 and 30 mounted on the output shaft 11 on either side of the driven gear 28 and disposed in bores in the walls 14 and 15, respectively. The output shaft 11 is also journalled in a straight roller bearing 31 which is mounted to the wall 18. The outer races of bearings 29 and 30 are slidably received in their respective bores so that the output shaft 11 is able to move to a limited extent under thrust loads. An annular keeper 32 mounted against the input wall 14 restricts movement of the bearing 29 and the output shaft 11 in the direction of the equipment to be driven.

The end of the output shaft 11 remote from the equipment to be driven is provided with a thrust bearing indicated generally by the reference numeral 33. The thrust bearing 33 includes a hardened inner race 34 which is set into a hub 35 secured on the end of the output shaft 11. A hardened outer race 36 is biased towards the inner race 34 by a series of compression springs 37 which are held in recesses in the end plate of a frustro-conical cap 38 which is mounted to the input wall 14. Tapered roller bearings 39 are held between the inner and outer races 34 and 36, respectively. The thrust bearing 33 is able to accommodate the axial loads which are imparted to the output shaft 11 by reason of the equipment to which it is connected. What has been described thus far is the common method for absorbing the thrust loads on an input shaft.

The second output shaft 12 is also driven from the input shaft 10 but by means of a divided gear train. Specifically, the input shaft 10 mounts a second drive pinion 40 on an outboard portion beyond the first intermediate wall 15. The second drive pinion 40 meshes with a pair of identical first intermediate gears 41a and 41b each of which is mounted on a quill shaft journalled in bearings mounted in the intermediate walls 15 and 16 and coupled to shafts 42a and 42b journalled in bearings in the walls 17 and 18. The two shafts 42a and 42b each mount an intermediate pinion 43a and 43b disposed between the third intermediate wall 17 and the output wall 18. The two intermediate pinions 43a and 43b mesh with identical second intermediate gears 44a and 44b, respectively, each of which is mounted on short shafts 45a and 45b journalled in suitable bearings in the walls 17 and 18. The two second intermediate gears 44a and 44b mesh with and drive a driven pinion 46 secured to the second output shaft 12.

It will thus be seen that the second output shaft 12 is driven by a divided gear train which includes, in order, the pinion 40, the first intermediate gears 41, the intermediate pinions 43, the second intermediate gears 44 and the driven pinion 46.

Because of the close proximity of the output shafts 11 and 12 to each other, it is not possible to mount on the second output shaft 12 a thrust bearing such as the thrust bearing 33. The diameter required for such a thrust bearing substantially exceeds the available space between the two output shafts. Since the second output shaft 12 is also subjected to thrust from the driven equipment, provision must nevertheless be made to absorb the thrust loads with suitable bearings. This is accomplished by first dividing and then moving the thrust load to areas removed from the center lines of the output shafts where thrust bearings can be accommodated.

To divide and move the thrust load, a double helical pinion 50 is mounted on the output shaft 12. The double helical pinion meshes with two identical double helical gears 52a and 52b each of which is mounted on a gear shaft 53a and 53b, respectively. The output shaft 12 is journalled in a double-row tapered roller bearing 54 which has its outer race slidably received in a bore in the output wall 18 and in a similar double-row tapered roller bearing 55 which has its outer race slidably received in a bore 56 in the second intermediate wall 16. A cup-shaped retainer 57 is also received in the bore 56. The retainer 57 has the edge of its rim in contact with the outer race of the roller bearing 55. Springs 58 mounted in recesses in a plug 59 bear against the retainer 57 to urge the retainer against the roller bearing 55 and push bearing 54 against a shoulder located in wall 18. The plug 59 is retained against axial motion by a snap ring 66 received in a groove in the bore 56. The arrangement for mounting the second output shaft 12 which has been described allows the second output shaft 12 to float axially to a limited degree. The engagement of the helical pinion 50 with the helical gear 52 will cause the second output shaft 12 to adapt an axial position based upon the thrust loads on the output shaft 12 and the reaction against such loads at the meshing helical gear teeth.

Some of the thrust loads on the output shaft 12 will be absorbed by the springs 58. The principal vehicle for absorbing the thrust loads are two identical thrust bearings indicated generally by the numerals 60a and 60b which work against ends of the gear shafts 53 which mount the helical gear 52. The gear shafts 53 are each mounted in a pair of double-row tapered roller bearings 61 and 62. The inner races of the bearings 61 and 62 are axially restrained on the gear shafts 53. The outer races of the bearings 61 and 62 are slidably received in bores in the second and third intermediate walls 16 and 17 so that the gear shafts can move axially. Alternatively, straight roller bearings could be substituted for the tapered bearings 61 and 62 to allow for the axial movement of the gear shafts 53. The innermost end of each gear shaft 53 bears against the inner race 63 of a tapered roller thrust bearing 60a or 60b. The outer race 64 rests against springs 65 held in recesses in a cage 70 which is slidably received in the second intermediate wall 16.

Each cage 70 has a circular protuberance 71 which bears against one end of a linkage which will distribute thrust loads equally between the two thrust bearings 60a and 60b.

The linkage comprises two outer links 72 and a center link 73 each of which is pivotally mounted adjacent its mid point on a bolt 74 which passes through spaced flanges 75 and 76 of a bracket 77 which extends from the rear of the intermediate wall 16. The outer links 72 each contain offset surfaces connected by a shoulder 80. The center link 73 has two shoulders 81 which engage with the shoulders 80 of the outer links 72.

In operation, under thrust loads on the second output shaft, the helical pinion 50 will tend to screw so that the teeth will be loaded on one side on one of the rows of helical teeth and on the opposite side of the other row of helical teeth. This will transmit the thrust loads to the helical gears 52 and from these into the two gear shafts 53 which are spaced away from the output shafts 11 and 12 and which carry the large thrust bearings 60a and 60b. The thrust load will be equally divided between the two thrust bearings 60a and 60b because any unequal distribution of thrust load will cause a cage 70 to pivot one end of the linkage and this will be transmitted directly to an oppositely directed force on the other end of the linkage and on the cage 70 at such other end.

Not only does the arrangement which has been described move and divide the thrust load to shafts which can carry large thrust bearings, it also has the added advantage of reducing the speed at which the thrust bearings must operate by reason of the gear ratio between the helical pinion and helical gears. This is most beneficial in that the bearing life will be prolonged.

Although the linkage for equalizing the load on the thrust bearings 60a and 60b is a valuable adjunct of the arrangement for dividing and moving the thrust load, that arrangement can function without such a linkage. Alternatively, the two cages 70 can have their protuberances 71 bearing against a plate anchored to the wall 16. The combination of the Hertzian compliance of the protuberances 71 and the elasticity of the plate would absorb and to some extent equalize the thrust load.

I claim:

1. Apparatus for accommodating thrust loads on a driven output shaft of a gear drive which includes a housing having support walls, comprising:

first bearing means journaling the output shaft in support walls of said housing and accommodating limited axial movement of the output shaft;

a double helical pinion on the output shaft;

a pair of parallel gear shafts spaced from the output shaft and from each other, each of said gear shafts mounting a double helical gear meshing with said double helical pinion;

second bearing means journaling each of the gear shafts in support walls of said housing and accommodating limited axial movement of said gear shafts; and a pair of thrust bearings each working against an end of a respective one of said gear shafts.

2. An apparatus in accordance with claim 1 together with a load equalizing linkage responsive to the axial movement of the gear shafts under thrust loads to translate such loads from one gear shaft to the other so that the thrust bearings are equally loaded.

3. An apparatus in accordance with claim 2 wherein each thrust bearing comprises tapered rollers held between an inner race abutting the end of the respective gear shaft and an outer race abutting springs, said springs being supported by a cage which is slidably received in a support wall of said housing, the cages of the two thrust bearings bearing against opposite ends of said linkage.

4. An apparatus in accordance with claim 3 wherein said linkage comprises a pair of outer links and a center link each pivotally supported intermediate its ends on a bracket extending from a support wall of said housing, an inner end of each outer link bearing against an end of the center link and said cages bearing against the respective outer links adjacent the opposite ends thereof.

5. An apparatus in accordance with claim 1 wherein said first bearing means comprises a pair of double-row tapered roller bearings having their outer races slidably received in bores in said support walls, one of said roller bearings having its inner race axially restrained on said output shaft adjacent the end of said output shaft which is internal of said housing, together with spring-biased means operating against the outer race of said one roller bearing to urge such bearing and output shaft in a direction outwardly of said housing.

6. In a gear drive having a housing including support walls, a single input shaft and a pair of parallel, closely spaced output shafts, a first gear train drivingly connecting the input shaft to one end of said output shafts, a thrust bearing on an end of said one output shaft, and a second gear train drivingly connecting the input shaft to the second output shaft, the combination therewith of:

first bearing means journaling the second output shaft in support walls of said housing and accommodating limited axial movement of the second output shaft;

a double helical pinion on the second output shaft;

a pair of parallel gear shafts spaced from both of the output shafts and from each other, each of said gear shafts mounting a double helical gear meshing with said double helical pinion;

second bearing means journaling each of the gear shafts in support walls of said housing and accommodating limited axial movement of said gear shafts; and a pair of thrust bearings each working against an end of a respective one of said gear shafts.

7. A gear drive in accordance with claim 6 together with a load equalizing linkage responsive to the axial movement of the gear shafts under thrust loads to translate such loads from one gear shaft to the other so that each of said pair of thrust bearings is loaded equally.

8. A gear drive in accordance with claim 7 wherein each of said pair of thrust bearings comprises tapered rollers held between an inner race abutting against the end of the respective gear shaft and an outer race abutting against springs, said springs being supported by a cage which is slidably received in a support wall of said housing, the cages of the pair of thrust bearings bearing against opposite ends of said linkage.

9. A gear drive in accordance with claim 8 wherein said linkage comprises a pair of outer links and a center link each pivotally supported intermediate its ends on a bracket extending from a support wall of said housing, an inner end of each outer link bearing against an end of the center link and said cages bearing against the respective outer links adjacent the opposite ends thereof.

10. A gear drive in accordance with claim 6 wherein said first bearing means comprises a pair of double-row tapered roller bearings having their outer races slidably received in bores in said support walls, one of said roller bearings having its inner race axially restrained on said second output shaft adjacent the end of said second output shaft which is internal of said housing, together with spring-biased means operating against the outer race of said one roller bearing to urge such bearing and second output shaft in a direction axially outwardly of said housing.

11. An apparatus in accordance with claims 1 or 6 wherein each of said second bearing means comprises a pair of double-row tapered roller bearings having their outer races slidably received in bores in said support walls.

12. An apparatus in accordance with claims 1 or 6 wherein the gear ratio between said helical pinions and said helical gears is substantially greater than 1 so that the gear shafts are driven at a reduced speed.

* * * * *

UNITED STATES PATENT AND TRADEMARK OFFICE
CERTIFICATE OF CORRECTION

PATENT NO. : 4,361,058
DATED : November 30, 1982
INVENTOR(S) : Ronald A. Witt

It is certified that error appears in the above—identified patent and that said Letters Patent is hereby corrected as shown below:

Column 5, line 52, delete "end"

Signed and Sealed this

First Day of March 1983

[SEAL]

Attest:

GERALD J. MOSSINGHOFF

Attesting Officer   Commissioner of Patents and Trademarks